United States Patent [19]

Brown

[11] Patent Number: 4,551,646

[45] Date of Patent: Nov. 5, 1985

[54] DOUBLE COIL CONSTANT FORCE EXTENSION SPRING BRACKET

[75] Inventor: Gerald W. Brown, Christiansburg, Va.

[73] Assignee: Kollmorgen Technologies Corporation, Dallas, Tex.

[21] Appl. No.: 411,076

[22] Filed: Aug. 24, 1982

[51] Int. Cl.[4] .............................................. H02K 13/00

[52] U.S. Cl. .................................... 310/242; 310/145; 29/597

[58] Field of Search ............... 310/239, 240, 241, 242, 310/244, 245, 246, 247, 249, 42, 248, 226; 29/597

[56] References Cited

U.S. PATENT DOCUMENTS

| | | | |
|---|---|---|---|
| 2,695,468 | 11/1954 | Welch | 310/246 |
| 2,848,633 | 8/1958 | Atamian | 310/245 |
| 3,430,084 | 2/1969 | Hall | 310/242 |
| 3,430,915 | 3/1969 | Vogelsberg | 310/245 |
| 3,898,493 | 8/1975 | Schaffer | 310/239 |
| 4,389,598 | 6/1983 | Rankin | 310/245 |
| 4,413,200 | 1/1983 | Fenicle | 310/239 |

FOREIGN PATENT DOCUMENTS

| | | | |
|---|---|---|---|
| 3010036 | 10/1981 | Fed. Rep. of Germany | 310/242 |

OTHER PUBLICATIONS

Data Book, Sec. 70.3, pp. 4–9, issued 3/22/56 by Hunter Spring Company, Lansdale, Pa.

*Primary Examiner*—R. Skudy

*Attorney, Agent, or Firm*—Morgan, Finnegan, Pine, Foley & Lee

[57] ABSTRACT

A brush holder assembly providing longer brush life and easy brush replacement is disclosed. The assembly uses a removeable spring bracket to extend a double coil constant force extension spring straddling a brush. The bracket, straddling the spring and brush, is inserted into a brush holder, whereupon it slideably engages the coils of the extension spring, causing it to extend. The bracket is removeable from the holder so that the extension spring and brush can be removed to replace a worn or broken brush.

9 Claims, 5 Drawing Figures

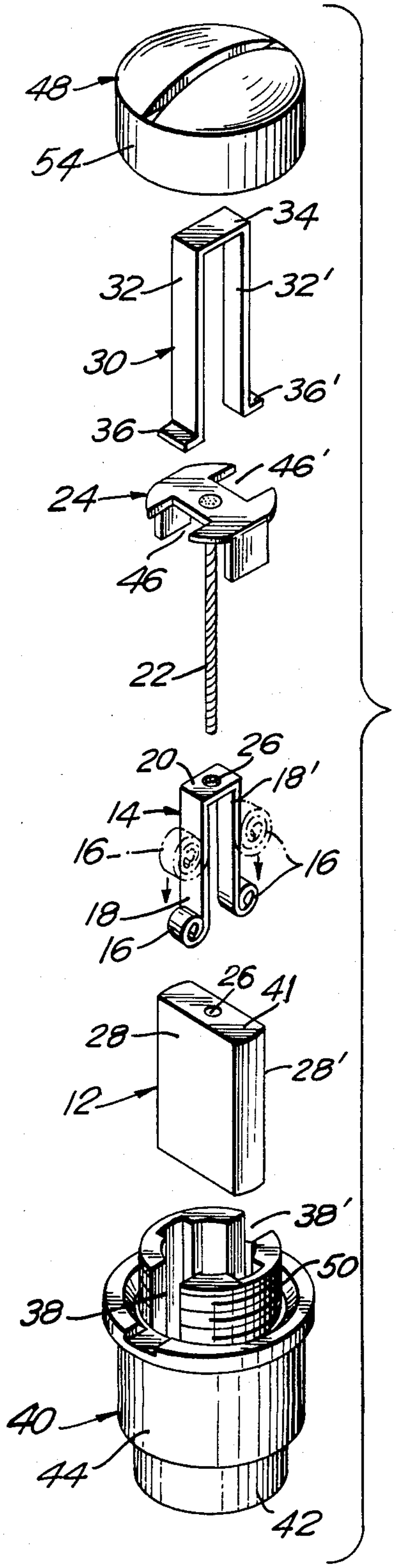
FIG. 3
FIG. 1
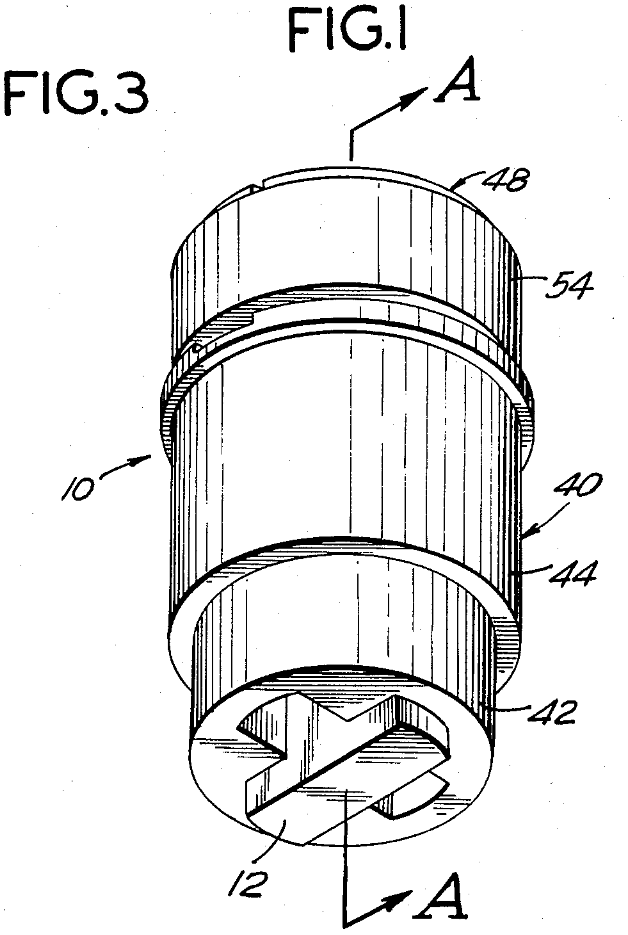

DOUBLE COIL CONSTANT FORCE EXTENSION SPRING BRACKET

BACKGROUND OF THE INVENTION

The use of sliding contacts, or brushes, as current conductors between an externally connected circuit and the rotating part of a D.C. motor, i.e., its commutator, is common practice today. Nevertheless, such brushes are usually an undesirable feature because of maintenance problems such as replacing worn or broken brushes.

In a typical D.C. motor the brushes are held in contact with the commutator by means of brush springs. Typically, these springs are single coil compression springs placed in line with the brushes. Each spring engages one end of a brush and exerts pressure on the brush in the direction of the commutator.

One problem with this arrangement is that the length of a brush, and therefore its life, it limited by the position of the single coil compression spring with respect to the brush. Another problem is the uneven pressure exerted by a coil spring over the life of a brush caused by the spring moving from a compressed state to an extended state as the brush wears over time. This change in pressure prevents the optimization of the rate of brush wear so as to achieve longer brush life and, when the spring is extended, good vibration response characteristics.

Improvements have been achieved as to some of these problems through the use of constant force type springs. However, in applications using motors in the low integral horse power range, the principles of constant force spring arrangements have not been practiced due to the cost of such arrangements and the problems associated with brush replacement.

The cost of single coil constant force extension spring assemblies tends to be more than the cost of comparable single coil compression springs. This is mainly due to the cost of connecting the extension spring to a backer plate used to make the brush replaceable. In contrast, the cost of double coil constant force extension springs tend to be less than the cost of single coil compression springs because such extension springs have been traditionally used without backer plates. However, this lower cost advantage is offset by the fact that traditionally replacement of the brushes requires removing a motor's commutator, which is generally impractical once the motor has been placed in field service.

SUMMARY OF THE INVENTION

It is a principal object of the present invention to provide a brush holder assembly which allows the use of larger brushes for longer brush life, and which allows a worn or broken brush to be easily replaced. Another object of the present invention is to provide a brush holder assembly which uses a constant force brush spring for longer brush life and improved vibration response characteristics, yet which allows for easy removal from the brush holder assembly. A further object of the present invention is to provide a brush holder assembly using a spring bracket to engage a constant force brush spring in a manner which allows the brush to be easily replaced even after it has been in service in the field.

According to the present invention, a brush holder assembly is provided which uses a spring bracket that slideably engages the coils of a double coil constant force extension spring straddling a brush. The spring is placed over a shunt of the brush before the shunt is connected to a shunt cap or the brush. Thereafter, one end of the flexible shunt is tamped into the top of the brush, while the other end of the shunt is soldered to the shunt cap. The spring bracket is used to extend the spring and may be used to hold the spring by means of a friction fit. This is achived by causing the spring bracket to straddle the shunt cap and part of the spring/brush assembly so as to hug the assembly. This entire assembly is then pushed down into a pair of slots in a brush holder. As the assembly is inserted into the slots, the coils of the spring slidably engage the spring bracket, thereby allowing such coils to unwind and, in turn, the spring to extend and exert pressure on the brush in the direction of the commutator. With the shunt cap engaging the top of the bruch holder a brush cap is then removeably attached to the top of the brush holder to hold the brush holder assembly components in place, completing the assembly. Thus, a simple dismanteling of this assembly allows any worn or broken brush to be easily replaced.

DESCRIPTION OF THE DRAWINGS

FIG. 1 is an isometric view of the brush holder assembly completely assembled.

FIG. 3 is an exploded view of the components comprising the brush holder assembly.

DESCRIPTION OF THE PREFERRED EMBODIMENTS

Figure 2:
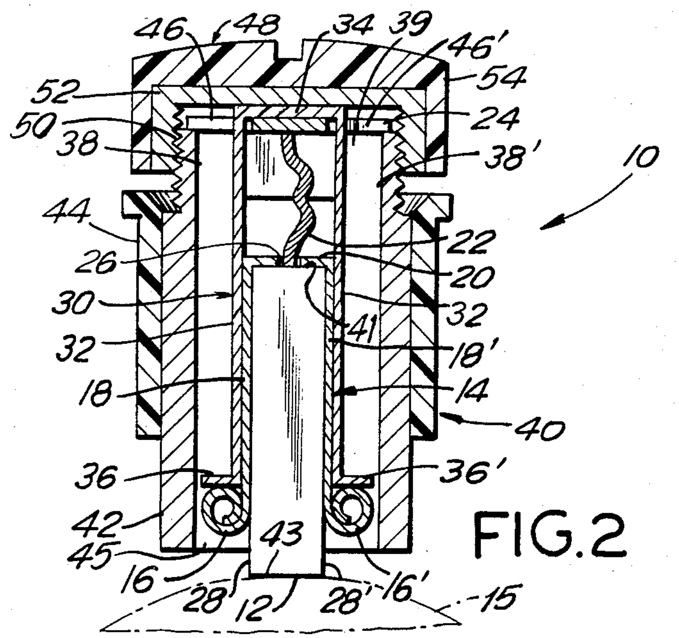
FIG. 2 is a sectional view of the brush holder assembly completely assembled taken along the line AA of FIG. 1.

The brush holder assembly of the present invention provides a constant force brush spring arrangement wherein the brush can easily be replaced. FIGS. 1 to 3 show a brush holder assembly 10 with a brush 12 inserted therein. The holder assembly may be opened for easy brush replacement. Brush 12 is straddled by a constant force extension spring 14 having two extendable spring coils 16 and 16'. Coils 16 and 16' are each an integral part of one end of the legs 18 and 18', respectively, comprising spring 14. The other end of the legs are interconnected by means of a saddle 20.

In the preferred embodiment of the present invention a flexible shunt 22, interconnecting a shunt cap 24 and brush 12, is fed through spring 14. For this purpose a hole 26 is placed in the saddle.

During the assembly of holder assembly 10, after flexible shunt 22 is fed through hole 26, one of its ends is soldered to shunt cap 24, while the other end is tamped into the top of the brush. This arrangement insures that spring 14 will remain with brush 12 whenever it is inserted or removed from the holder assembly. Thereafter, spring 14 is fitted over brush 12 such that its legs partially straddle brush 12's sides 28 and 28'. At this point spring 14 is in a retracted state.

To cause spring 14 to exert pressure on brush 12 in the direction of the commutator 15, holder assembly 10 is provided with a steel spring bracket 30 having two parallel legs 32 and 32' interconnected at one end by a cross member 34. Orthogonally attached to the opposite ends of these legs are arms 36 and 36'.

Bracket 30 is designed to hold spring 14 by means of its two legs straddling and hugging the sides of spring 14. During the assembly of holder assembly 10 bracket 30, while partially straddling spring 14 and brush 12, is inserted into a pair of longitudinally extending slots 38 and 38' of a brush holder 40 through an axial end opening 39 thereof removed from commutator 15. During this motion arms 36 and 36' slidably engage coils 16 and 16', respectively, thereby allowing them to unwind and extend as cross member 34 moves in the direction of brush 12 and saddle 20. When the bracket is finally completely inserted, it causes spring 14 to be substantially extended so that it exerts constant pressure on one end 41 of brush 12 in the direction of the commutator, causing the opposite end 43 of brush 12 to protrude from a second axial end opening 45 of holder 40 and contact commutator 15. As can be seen in FIG. 2, opening 45 is substantially adjacent commutator 15.

Brush holder 40 consists of a cylindrical body 42 partially surrounded by an annular insulator 44. Body 42 is constructed from a conductive material such as brass, while insulator 44 is fabricated from a non-conductive material such as nylon. End openings 39 and 45 are disposed along the longitudinal axis of body 42. Body 42 also has slots 38 and 38' cut therein to accept the legs of bracket 30 during assembly of the holder assembly 10.

In its assembled position shunt cap 24 engages the top of brush holder 40, and is covered by cross member 34. Thus, spring bracket 30 in its assembled position straddles not only brush spring 14 but also shunt cap 24. For this purpose the shunt cap is provided with two slots 46 and 46' through which legs 32 and 32' pass during assembly.

To hold the above components in place after insertion a brush cap 48 is attached to brush holder 40. For this purpose body 42 of holder 40 is provided with threads 50, which are engaged by a threaded insert 52 of the brush cap. This insert is covered by an insulating cover 54. Insert 52 is also constructed from a conductive material such as brass, while cover 54 is fabricated from a non-conductive material such as plastic. Removal of brush cap 48 allows brush 12, spring 14 and spring bracket 30 to be removed from holder 40 through end opening 39.

Figure 4:
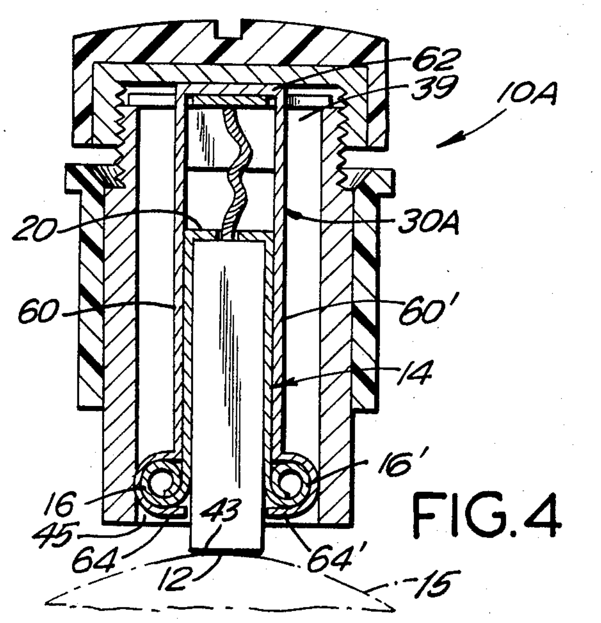
FIG. 4 is a sectional view of an alternative embodiment of the brush holder assembly using a second embodiment of the spring bracket.

FIG. 4 illustrates an alternative embodiment using a different type of spring bracket. In this embodiment spring bracket 30A includes two parallel legs 60 and 60' interconnected at one end by a cross member 62. Ears 64 and 64' are attached to the opposite ends of the legs, and are substituted for arms 36 and 36' of bracket 30 (FIG. 2). The ears are orthogonal to legs 60 and 60' and are designed to surround coils 16 and 16'. During assembly of the brush holder assembly, as spring 14 is extended, ears 64 and 64' slidably engage coils 16 and 16', thereby allowing them to unwind and spring 14 to extend as cross member 62 is pushed toward saddle 20 and brush 12. Because these ears surround the coils, they serve to hold spring 14 in place with respect to bracket 30A and brush 12. Thus, in this embodiment shunt 22 is pushed to one side of spring 14 during assembly, and the need for a hole in the cross member 62 to accomodate the shunt is eliminated.

Figure 5:
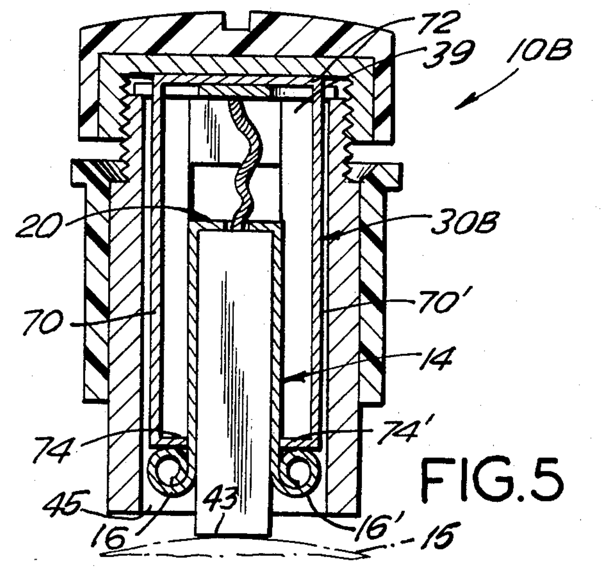
FIG. 5 is a sectional view of another alternative embodiment of the brush holder assembly using a third embodiment of the spring bracket.

FIG. 5 illustrates yet another embodiment using a third type of spring bracket. In this embodiment spring bracket 30B includes two parallel legs 70 and 70' with an increased separation relative to the legs of brackets 30 (FIG. 2) or 30A (FIG. 4). The legs are joined at one end by a cross member 72. Unlike arms 36 and 36' which are directed away from the center of bracket 30, bracket 30B is provided with two arms 74 and 74' which are orthogonally attached to the ends of legs 70 and 70', respectively, and directed inward toward the center of the bracket. As spring 14 is extended during assembly of holder assembly 10B, these arms slidably engage coils 16 and 16', thereby allowing them to unwind, and the spring to extend. As in the case of bracket 30, brackets 30A and 30B are also constructed from a suitable material such as stainless steel.

The following data was obtained in life tests on two different sized motors (one approximately 2 H.P., and another approximately 4 H.P.), comparing the brush holder according to the present invention with a standard single coil compression spring brush holder. With the brush holder of the present invention the brush life is seen to increase and the wear rate is seen to improve in both motors.

| | Standard Coil Spring | Invention Constant Force Spring |
|---|---|---|
| Average Brush Life | | |
| 2 H.P. | 1** | 1.59 |
| 4 H.P. | 1 | 1.59 |
| Worst Case Brush Life* | | |
| 2 H.P. | 1 | 1.11 |
| 4 H.P. | 1 | 1.60 |
| Wear Rate | | |
| 2 H.P. | 1 | 0.61 |
| 4 H.P. | 1 | 0.63 |
| Worst Case Wear Rate* | | |
| 2 H.P. | 1 | 0.83 |
| 4 H.P. | 1 | 0.63 |

*Based on individual brush within motor which exhibits worst wear characteristics.
**Data is normalized to standard coil spring loaded brushes as 1.

The above data demonstrates that the brush life and wear rate for brushes using a constant force spring arrangement are better than the brush life and wear rate for brushes using a single coil compression spring arrangement. Further, in some applications the use of a longer brush length is possible with a constant force spring arrangement because of the design of this arrangement. The result of using longer brushes can be as much as 42 percent more brush life for the already extended life of a brush used with a constant force spring arrangement. The above data was based on life tests that did not allow the standard coil spring to go to low end pressures. Thus, the tests were somewhat biased in favor of standard single coil compression springs, implying that actual operating results may be even better.

The above described embodiments of the invention are illustrative, and modifications thereof may occur to those skilled in the art. The invention is not limited to the embodiments disclosed herein, but is to be limited only as defined by the appended claims.

What is claimed is:

1. An improved brush holder assembly of the type having a brush connected to a shunt cap through a shunt and straddled by a constant force spring having two extendable coils, wherein the improvement comprises a spring bracket straddling the spring and a shunt cap and slidably engaging the coils of the spring so that the coils may be extended, a holder open on both ends into which said spring bracket is removably inserted so that the brush partially protrudes from one end of said holder, and a cap for closing the other end of said holder removably attached thereto, said spring bracket being comprised of a pair of arms slidably engaging the coils of the spring, the shunt cap having slots therein so that said spring bracket can straddle said shunt cap and yet hug said spring, and thereby the brush.

2. A brush holder assembly as recited in claim 1 wherein said spring bracket is further comprised of a pair of legs each of which is attached on one end to one of said arms, and which hug said spring so that said arms point away from the center of said spring bracket.

3. A brush holder assembly as recited in claim 1 wherein said spring bracket is further comprised of a pair of legs each of which is attached on one end to one of said arms, and which are spaced away from said spring so that said arms point toward the center of said spring bracket.

4. An improved brush holder assembly of the type having a brush connected to a shunt cap for a shunt and straddled by a constant force spring having two extendable coils, wherein the improvement comprises a spring bracket straddling the spring and said shunt cap and slidably engaging the coils of the spring so that the coils may be extended, a holder open on both ends into which said spring bracket is removably inserted so that the brush partially protrudes from one end of said holder, and a cap for closing the other end of said holder removably attached thereto, said spring bracket being comprised of a pair of ears slidably engaging the coils of the spring, and wherein the shunt cap has slots therein so that said spring bracket can straddle said shunt cap and yet hug said spring, and thereby the brush.

5. An improved brush holder assembly as recited in claims 1 or 4 wherein the improvement further comprises the spring having a hole therein so that the shunt can pass through the spring to hold the spring and the brush together during insertion in or removal from said holder.

6. A brush holder assembly as recited in claim 4 wherein said spring bracket is further comprised of a pair of legs each of which is attached on one end to one of said ears, and which hug said spring so that said ears are directed away from the center of said spring bracket.

7. A brush holder assembly wherein a brush is removable comprising a constant force spring having two extendable coils and straddling the brush, a shunt cap, a shunt disposed between and interconnecting the brush and said shunt cap, a spring bracket straddling said spring and said shunt cap and having means for slidably engaging said coils of said spring, a brush holder open on both ends into which said spring bracket is inserted so that an end of the brush partially protrudes from one end of said brush holder, and a cap for sealing the other end of said brush holder, removably attached thereto, said spring bracket being comprised of a pair of arms slidably engaging said coils of said spring, and a pair of legs each of which is attached to one end of one of said arms, and which hugs said spring so that said arms point away from the center of said spring bracket, and wherein said shunt cap has slots cut therein so that the legs of said spring bracket can pass through said slots to straddle said shunt cap.

8. A brush holder assembly as recited in claims 7, wherein said spring has a hole to allow said shunt to pass through said spring so that said spring remains attached to the brush when the brush is inserted in or removed from said brush holder.

9. A brush holder assembly as recited in claim 7 wherein said brush holder has a plurality of slots into which said sprng bracket is removably inserted.

* * * * *